United States Patent
Knorr et al.

(10) Patent No.: US 10,591,304 B2
(45) Date of Patent: Mar. 17, 2020

(54) METHOD FOR LOCALIZING AN AUTOMATED MOTOR VEHICLE

(71) Applicant: Robert Bosch GmbH, Stuttgart (DE)

(72) Inventors: Moritz Michael Knorr, Hildesheim (DE); Alexander Geraldy, Hildesheim (DE); Christian Skupin, Garbsen (DE); Daniel Zaum, Sarstedt (DE); Emre Cakar, Sarstedt (DE); Hanno Homann, Hannover (DE); Holger Mielenz, Ostfildern (DE); Isabella Hinterleitner, Hildesheim (DE); Jochen Marx, Emmerke (DE); Lukas Klejnowski, Hannover (DE); Markus Langenberg, Hannover (DE); Michael Pagel, Bad Liebenzell (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/753,389

(22) PCT Filed: Jun. 17, 2016

(86) PCT No.: PCT/EP2016/064103
§ 371 (c)(1),
(2) Date: Feb. 19, 2018

(87) PCT Pub. No.: WO2017/028994
PCT Pub. Date: Feb. 23, 2017

(65) Prior Publication Data
US 2018/0245928 A1 Aug. 30, 2018

(30) Foreign Application Priority Data
Aug. 18, 2015 (DE) .......... 10 2015 215 699

(51) Int. Cl.
*G01C 21/32* (2006.01)
*G06F 16/9537* (2019.01)
(Continued)

(52) U.S. Cl.
CPC ............. *G01C 21/32* (2013.01); *G01C 21/30* (2013.01); *G06F 16/583* (2019.01);
(Continued)

(58) Field of Classification Search
CPC ....... G01C 21/30; G01C 21/32; G06F 16/583; G06F 16/9537; G06K 9/00791; G06K 9/00818; H04L 67/12
See application file for complete search history.

(56) References Cited

U.S. PATENT DOCUMENTS 6,088,650 A * 7/2000 Schipper ................ G01C 21/26
342/457
6,141,617 A * 10/2000 Matsuda ............. B60K 31/0066
340/438
(Continued)

FOREIGN PATENT DOCUMENTS

EP 2019382 A1 * 1/2009 ........... B60W 40/10
EP 2019382 A1 1/2009
(Continued)

OTHER PUBLICATIONS

International Search Report dated Sep. 22, 2016 of the corresponding International Application PCT/EP2016/064103 filed Jun. 17, 2016.

*Primary Examiner* — Babar Sarwar
(74) *Attorney, Agent, or Firm* — Norton Rose Fulbright US LLP; Gerard Messina

(57) ABSTRACT

A method of an automated motor vehicle for optimized communication from a server of localization reference data for a defined location includes a sensor of the motor vehicle
(Continued)

capturing driving environment data, linking the captured driving environment data to location information, based on the linking, localizing the motor vehicle at an achieved localization accuracy, identifying a setpoint localization accuracy at which an operation of the motor vehicle is to be performed, signaling to the server the achieved localization accuracy, and transmitting to the server a request for the localization reference data at the setpoint localization accuracy based on the signaled achieved localization accuracy.

15 Claims, 1 Drawing Sheet

(51) Int. Cl.
  G01C 21/30      (2006.01)
  G06F 16/583     (2019.01)
  G06K 9/00       (2006.01)
  H04L 29/08      (2006.01)
(52) U.S. Cl.
  CPC ..... *G06F 16/9537* (2019.01); *G06K 9/00791* (2013.01); *G06K 9/00818* (2013.01); *H04L 67/12* (2013.01)

(56) References Cited

U.S. PATENT DOCUMENTS

| | | | | |
|---|---|---|---|---|
| 6,199,001 B1* | 3/2001 | Ohta | ............... | B60K 31/0058 701/409 |
| 7,277,809 B1* | 10/2007 | DeWitt, Jr. | ............... | G01P 3/66 340/901 |
| 8,271,174 B2* | 9/2012 | Okada | ............... | B60W 40/10 701/1 |
| 8,666,591 B2* | 3/2014 | Stahlin | ............... | G01C 21/28 701/32.4 |
| 9,062,983 B2* | 6/2015 | Zych | ............... | G01C 21/32 |
| 9,817,399 B2* | 11/2017 | Braunstein | ............... | G01C 21/32 |
| 9,858,832 B1* | 1/2018 | Hsu-Hoffman | ............... | G09B 19/14 |
| 2005/0253926 A1* | 11/2005 | Chung | ............... | B61L 15/0027 348/148 |
| 2009/0265070 A1* | 10/2009 | Okada | ............... | B60W 40/10 701/70 |
| 2011/0054791 A1* | 3/2011 | Surampudi | ............... | G01C 21/005 701/472 |
| 2013/0035853 A1* | 2/2013 | Stout | ............... | G06T 17/05 701/438 |
| 2013/0131974 A1* | 5/2013 | Uyeki | ............... | G01C 21/32 701/410 |
| 2013/0332063 A1* | 12/2013 | Pirwani | ............... | G01C 21/32 701/409 |
| 2014/0244125 A1* | 8/2014 | Dorum | ............... | G01C 21/32 701/70 |
| 2016/0009296 A1* | 1/2016 | Iguchi | ............... | B60W 50/14 701/36 |
| 2016/0305794 A1* | 10/2016 | Horita | ............... | G01C 21/3602 |
| 2017/0008521 A1* | 1/2017 | Braunstein | ............... | G01C 21/32 |
| 2017/0243485 A1* | 8/2017 | Rubin | ............... | H04W 72/005 |
| 2018/0245928 A1* | 8/2018 | Knorr | ............... | G01C 21/30 |

FOREIGN PATENT DOCUMENTS

| | | |
|---|---|---|
| JP | H10185600 A | 7/1998 |
| JP | 2012085202 A | 4/2012 |
| JP | 2012221291 A | 11/2012 |

* cited by examiner

METHOD FOR LOCALIZING AN AUTOMATED MOTOR VEHICLE

CROSS-REFERENCE TO RELATED APPLICATIONS

The present application is the national stage of International Pat. App. No. PCT/EP2016/064103 filed Jun. 17, 2016, and claims priority under 35 U.S.C. § 119 to DE 10 2015 215 699.0, filed in the Federal Republic of Germany on Aug. 18, 2015, the content of each of which are incorporated herein by reference in their entireties.

FIELD OF THE INVENTION

The present invention relates to a method for localizing an automated motor vehicle. The present invention also relates to a system for localizing an automated motor vehicle.

BACKGROUND

Generally known methods for high-precision localization of motor vehicles all have in common that they require reference data (localization reference data or landmark data) for the localization that are typically captured by a local sensor system and are either locally aggregated in the vehicle (autonomous aggregation) or communicated to a server by a back-end connection and centrally aggregated there (collective aggregation). The last approach has the advantage of collectively accumulated and aggregated data that are available for a collective of vehicles.

SUMMARY

It is an object of the present invention to provide an improved method for localizing an automated motor vehicle.

According to a first aspect of the present invention, a method for localizing an automated motor vehicle includes: specifying a localization accuracy to be attained for the automated motor vehicle during operation, a motor vehicle requesting localization reference data for a defined location at the defined localization accuracy to be attained, communicating the localization reference data to the automated motor vehicle, using a sensor device to capture driving environment data of the automated motor vehicle, linking the captured driving environment data to location information, localizing the automated motor vehicle at an achieved localization accuracy using the localization reference data and the captured driving environment data, and signaling the achieved localization accuracy for purposes of an optimized communication of the localization reference data regarding the localization accuracy to be attained.

According to a second aspect of the present invention, a system for localizing an automated motor vehicle includes: a sensor device for capturing driving environment data of the motor vehicle, a position-sensing device for capturing a position of the motor vehicle, a localization device for localizing the motor vehicle and for ascertaining a localization accuracy of the motor vehicle, a first interface via which localization reference data for a defined location can be requested at a defined localization accuracy to be attained and communicated to the automated motor vehicle, and a second interface, via which an achieved localization accuracy can be signaled for purposes of optimizing the localization reference data regarding the localization accuracy to be attained.

It is thereby achieved that a feedback relating to the achieved localization accuracy is signaled by the automated motor vehicle on the basis of existing localization reference data. Consequently, depending on the required localization quality, suitable localization reference data can thereby be communicated to the motor vehicle.

The result is that a wireless transmission of localization reference data between the vehicle and an external server device is optimized as a function of a specified requirement of a function of the automated vehicle relating to a localization or positioning accuracy. In this context, only those localization reference data are transmitted that are also actually required for the motor vehicle localization accuracy to be attained. This can be advantageously used, in particular for a highly automated or autonomous motor vehicle. There is thus no exceedance or falling short of a desired localization accuracy, making it possible to optimize the technical requirements for position finding systems.

If a localization accuracy is not achieved using the available localization reference data, functionalities of the automated motor vehicle can be deactivated.

An advantageous embodiment of the method provides that a type and/or volume of the localization reference data communicated to the automated motor vehicle be dependent upon the attained and to be achieved localization accuracy. This makes it possible to consider, for example, that, depending on the localization accuracy achieved and to be attained, a suitable data record of localization reference data is made available, so that, in the case of self-localization of the automated vehicle, it is especially the required localization accuracy that ensues.

Another advantageous embodiment of the method provides that the localization reference data be communicated by a server device configured externally from the automated motor vehicle to the automated motor vehicle. This supports a high degree of up-to-datedness and a high storage volume of localization reference data for the automated motor vehicle.

Another advantageous embodiment of the method provides that driving environment conditions be considered when preparing a data record of localization reference data to attain the specified localization accuracy. This makes it possible to consider that a sensor's performance typically varies in response to different ambient conditions. Generally, more localization reference data are needed at night than during the day for a required localization accuracy, so that a data-transfer rate for the localization reference data is thereby optimizable.

Another advantageous embodiment of the method provides that the properties of the sensor device be considered when preparing a data record of localization reference data to attain the specified localization accuracy. This allows the use of technically different sensors, generally, for example, high-performance sensors needing less data and lower-performance sensors needing more data for a required localization accuracy or localization quality.

Another advantageous embodiment of the method provides that the localization reference data be generated by a generating device and prepared for the server device. This makes it possible for a type of "data pool" of localization reference data to be generated and prepared for further use for the server device.

If the ascertained localization quality is high (i.e., for example, a required localization accuracy is exceeded in the automated motor vehicle), another advantageous embodiment of the method provides that the localization reference data be communicated to the automated motor vehicle in a volume that is reduced by a defined amount. Here, less localization reference data are needed than previously to attain a required localization quality, so that a quantity, or rather volume of localization reference data to be communicated can be advantageously reduced.

Another advantageous embodiment of the method provides that the localization reference data be communicated to the automated motor vehicle in a volume that is increased by a defined amount in response to the attained localization accuracy of the automated motor vehicle being low (i.e., for example, a required localization accuracy in the automated vehicle is not achieved). Here, more localization reference data are needed than previously to attain the required localization quality, so that a quantity, or rather volume of localization reference data to be communicated is advantageously increased.

Another advantageous embodiment of the method provides that the driving environment data linked to location information be communicated to the server device. A high degree of up-to-datedness of localization reference data is thereby supported. The generating device can generate, or rather extract, localization reference data from the communicated data.

Another advantageous embodiment of the method provides that the localization reference data be at least partially generated by a generating device configured in the motor vehicle. This makes it possible for a generation of the localization reference data to be partially transferred to the motor vehicle, thereby relieving a main generating device of the task of generating landmark data, and a lower data volume being generally achieved when the driving environment data are communicated to the server device.

The present invention is described in greater detail in the following with reference to other features and advantages on the basis of two figures. In this context, all the described or represented features, either alone or in any combination, constitute the subject matter of the present invention, regardless of the way they are combined in the patent claims or antecedents thereof, as well as independently of the formulation or presentation thereof in the description or in the figures. The primary purpose of the figures is to clarify some principles of the present invention.

DETAILED DESCRIPTION

Figure 1:
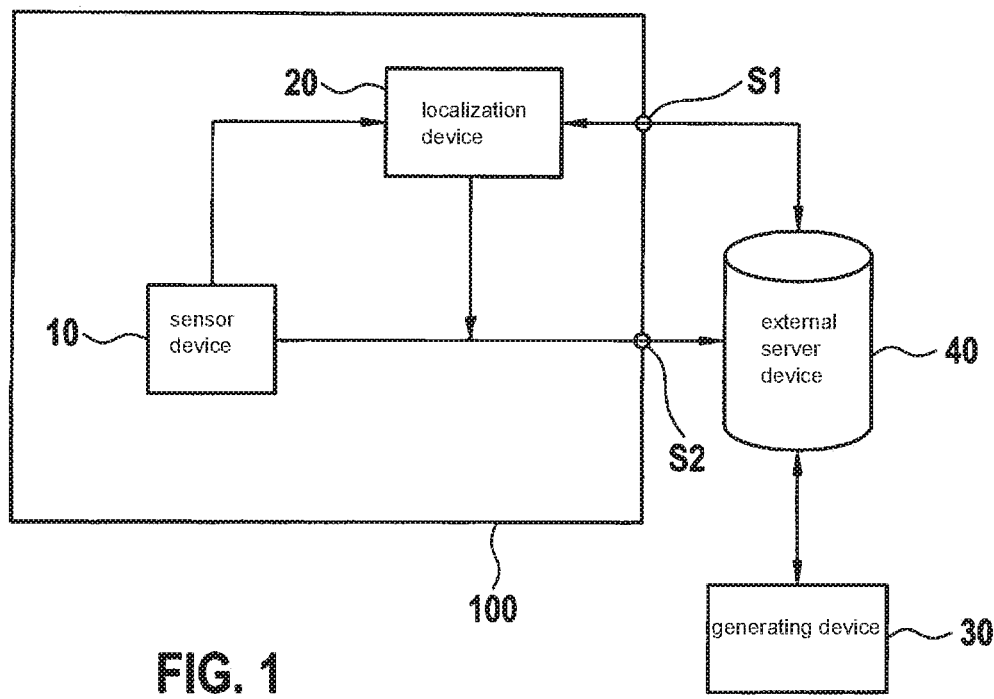
FIG. 1 a schematic view of a system according to an example embodiment of the present invention.

An automated or autonomous driving of a motor vehicle equipped with complete longitudinal and lateral guidance thereof requires a high localization accuracy of the motor vehicle in the driving environment on the order of approximately 10 cm. This enables the motor vehicle to stop precisely at a stop line in front of a traffic light, for example.

On the other hand, an assistance system for driver information requires a lower localization quality, a driver of the vehicle being informed, for example, that a right turn is to be taken very shortly. Thus, a low localization quality can be understood to be on the order of approximately 5 to 10 m.

An object in the driving environment that a motor vehicle passes by can be considered to be an example of a localization reference, or rather of localization reference data. A motor vehicle camera repeatedly captures the object (for example, a traffic sign) at a defined acquisition frequency, for example, every 50 ms, whereby the traffic sign is present as driving environment data in a plurality of images. A generation algorithm is used to generate a single localization reference datum in the form of the traffic sign. It is also possible to thereby determine the likelihood of the captured object being represented by generated localization reference data, or rather landmark data, or rather how certain the system is that the captured object is at a defined location.

Further generation steps can be applied to include the rate of detecting the object in the generation of the corresponding localization reference data in response to each passing of this object. Furthermore, the location accuracy, or rather the information about the spatial location of the localization reference data is generally improved during the generation.

In comparison to an independent generation (i.e., a generation only by the motor vehicle without a connection to a central database), the advantages the user derives by using a collectively generated database (i.e., a generation by a plurality of motor vehicles connected to a central database), can, in particular be: a greater accuracy of the aggregated data by using a larger database, greater local coverage of the generated data, and greater up-to-datedness of the generated data.

Transmitting suitable data between the server and client, preferably in real time constitutes an obstacle to preparing localization reference data for the highly accurate localization, since the data volumes required for the localization are typically quite large, for example, within the range of approximately 500 MByte/km.

A wireless communication interface between a server and the automated motor vehicle can constitute a bottleneck because the data are typically continuously reloaded. There are different requirements depending on the functionalities of the automated vehicle, a fully autonomous vehicle having the most stringent requirements concerning real-time transmission of the data. The data transmitted in real time are needed for a most accurate possible position finding, or rather localization of the motor vehicle.

It is, therefore, desirable to use only as much localization reference data as absolutely necessary to realize a specified localization accuracy, or rather localization quality.

The landmark data are pattern data, or rather reference data from a motor vehicle driving environment to which location information is added, or rather which are linked to location information. Effective landmark data are those having a high recognition value and a high positional accuracy in terms of a knowledge of a location situation of the landmark data, the high recognition value supporting a "more robust" localization, or rather position finding of the motor vehicle.

Conventional methods for generating landmark data for a high-accuracy localization use all potential recordable landmark data for generating the landmark data. All generated landmark data are used, in turn, for the localization.

What is disadvantageous in this conventional approach can be that possibly considerably more landmark data are processed and used for the localization than absolutely necessary. This can lead to an unnecessarily high data volume that is only overcome by significant computational outlay and can, therefore, be costly.

Therefore, an approach is provided for considering an actually achieved localization accuracy for transmitting or generating the landmark data, whereby a type of control is supported in the processing of the landmark data in the manner that only those landmark data are transmitted or generated that are required for achieving an existing localization accuracy. For example, a too low current localization accuracy results in more, preferably robust landmark data being communicated in the future to the automated motor vehicle for this driving environment situation.

On the other hand, if a greater localization accuracy is achieved than the required localization accuracy using the existing localization reference data, the result is that the amount of communicated landmark data is reduced for this driving environment situation for the localization until the required localization accuracy is obtained.

For future motor vehicles, in particular, this makes it advantageously possible that only as much landmark data as absolutely necessary always be communicated to the automated motor vehicle for localization, at the same position having similar requirements for localization accuracy.

The following dependencies are conceivably considered when determining the volume of required landmark data: a sensor system used in the motor vehicle, it being possible that the sensor system used influences a capturability of landmark data, for example, because of the different technical performances of various sensor technologies; and prevailing driving environment conditions, it being possible that rain, night, fog, etc., influence the detectability of landmark data, because the performance of sensor devices generally varies under different driving environment conditions. For an exact position finding, more landmark data are generally required at night than during the day when small amounts of robust landmark data usually suffice for the position finding.

FIG. 1 schematically shows components of a system 100 for localizing an automated motor vehicle, according to an example embodiment of the present invention. System 100 includes a sensor device 10 of the automated motor vehicle, preferably a video sensor, radar sensor, etc., which captures a driving environment and thereby ascertains driving environment data of the motor vehicle. For this purpose, sensor device 10 captures image data, in particular in the form of point clouds, line features, etc. The mentioned data can also include semantic features, such as trees, street lighting devices, buildings, etc.

To be able to enforce a certain general regulation for the motor vehicle, a position-sensing device (not shown), for example, in the form of a GPS system, is also provided in the automated motor vehicle. Thus, a general regulation for an accuracy of roughly 10 m, for example, can be provided for the motor vehicle.

The automated motor vehicle is localized, and a localization accuracy, or rather localization quality of the motor vehicle is ascertained on the basis of a required or predefined localization accuracy using a localization device 20 configured in the motor vehicle. The following data are examples of the data that can be included in the determination of the localization quality: the location accuracies and/or the volume of the localization reference data, and the degree of unique recognition of localization references (for example, traffic signs, objects in the driving environment, etc.) in the current vehicle driving environment using sensor device 10. Localization device 20 is thus able to ascertain or estimate the position of the motor vehicle and a corresponding accuracy of the position estimate on the basis of the existing localization reference data.

For the estimated position, a confidence value can also be ascertained that defines how precise the ascertained position is. This yields a specific localization accuracy. An average localization accuracy, or rather localization quality can be on the order of approximately 1 m; a low localization quality, for example, on the order of approximately 10 m; a high localization accuracy, for example, on the order of approximately 10 cm.

A generating device 30 configured in the proximity of an external server device 40 is provided for generating driving environment data captured by sensor device 10 and, accordingly, for extracting the localization reference data from the mentioned data. In an alternative (unillustrated) example embodiment, however, generating device 30 can also be configured within the automated motor vehicle. The current localization accuracy typically provided by localization device 20 is also considered when the localization reference data are generated.

A value of an ascertained localization accuracy is signaled via a second interface S2 of system 100 to server device 40. In effect, a communication of localization reference data to the automated motor vehicle via a first interface S1 can be reduced in response to a high localization accuracy, due, for example, to an "exceedance" of a required, or rather predefined localization accuracy. Furthermore, in response to a low localization quality due to the required localization accuracy being "fallen short of," for example, a greater volume of localization reference data can thereby be communicated via first interface S1 to the motor vehicle to achieve the predefined localization accuracy.

This makes it possible to optimize the operation of a wireless data communication between the external server device 40 and the automated motor vehicle.

The driving environment data linked to location information can be communicated via second interface S2 to external server device 40 in real time or following a time delay.

The vehicle can request landmark data preferably via first interface S1 and alternatively or additionally via second interface S2, with the following being a non-exhaustive list of example parameters to be provided, for example: location for which the landmark data are requested; driving environment conditions (day/night, snow, rain, etc.); sensor properties (sensor type, etc.); and required localization accuracy.

The landmark data communicated by external server device 40 to the motor vehicle via first interface S1 can also be provided in real time and/or continuously preloaded (prefetched) into the motor vehicle and continuously reloaded as needed.

Thus, interfaces S1, S2 of system 100 represent data bottlenecks that have limited data transmission capacity and can be designed as wireless interfaces or w-Lan interfaces of the automated motor vehicle.

The current driving environment situation (for example, at least the current location, also current driving environment conditions, such as night, rain, fog, etc.) and, optionally, the current performance of sensor device 10 can also be communicated to server device 40 when driving environment data 10 linked to location information, or rather the localization accuracy are communicated to server device 40. It is thus possible to consider that, under unfavorable weather conditions, such as rain, fog, snowfall, etc., for example, sensor device 10 is able to deliver other data, or rather images for the self-localization than under sunshine.

In terms of resolution, image precision, fidelity to detail, etc., sensor devices 10 can have different properties. The generation of the landmark data can also be dependent on a performance of sensor device 10, whereby it can be considered that motor vehicles having low-performance sensor systems generally require substantially more landmark data for a precise position finding than motor vehicles having high-performance sensor systems.

The result is supported by the fact that if the required localization accuracy was presently fallen short of ("less than accurate position finding"), more localization reference data are transmitted by server device 40 and optionally also generated by generating device 30. This makes it possible to provide localization reference data that render possible an improved localization accuracy for future automated motor vehicles at the same position in response to similar localization accuracy requirements.

Server device 40 knows the volume, or rather the types of localization reference data that are necessary at various locations for a required localization quality. It is, therefore, always able to provide the motor vehicle with precisely those landmark data that it needs. An optimized data transmission from server device 40 to the motor vehicle is thereby supported.

On the other hand, if the required localization accuracy is currently exceeded ("overly accurate position finding"), server device 40 transmits a lower volume of landmark data or no landmark data at all for the current driving environment situation.

In effect, this means that if the ascertained localization quality is high, a data transfer rate of the localization reference data is reduced, whereas if the ascertained localization quality is low, a data transfer rate of the localization reference data is increased.

Localization device 20 and generating device 30 can preferably be technically implemented as software, whereby a simple updating and modification of performance features of the mentioned devices are supported. Alternatively, localization device 20 can be implemented as hardware, for example, as an ASIC (application-specific integrated circuit) or FPGA (field programmable gate array).

In a variant not shown in the figures, server device 40 may be configured within system 100 and thus within the automated motor vehicle. This is advantageously supported by the fact that a data volume to be transmitted to the database internal to the motor vehicle is optimized, thereby allowing a more efficient design thereof.

A practical example of the method can be realized as follows: using sensor device 10 thereof, an automated, or rather autonomous motor vehicle captures driving environment data during the drive and links them to location information originating from the position determining device (the latter can be a component of sensor device 10, for example, in the form of a GPS sensor). The automated motor vehicle is localized, and a localization quality of the motor vehicle is ascertained relative to a required localization accuracy with the assistance of landmark data available in the motor vehicle that can be provided by an internal server or by external server device 40, as well as with the assistance of driving environment data actively captured by sensor device 10. The ascertained localization accuracy is communicated via second interface S2 to server device 40.

The localization can employ a triangulation method, for example, that takes advantage of the fact that sensor device 10 is also able to ascertain the distance of the object relative to the motor vehicle.

Furthermore, the driving environment data captured by sensor device 10 and linked to location information are communicated via second interface S2 to server device 40 to make them available to generating device 30 for generating, updating and/or improving the landmark data.

If an overly accurate localization is achieved, whereby the required localization accuracy is exceeded, server device 40 transmits less landmark data via first interface S1, or rather generating device 30 generates less landmark data as a function of the level of the ascertained localization quality.

If, on the other hand, the localization quality attained is low, i.e., the required localization accuracy is not met, server device 40 transmits a larger volume of landmark data to the motor vehicle via first interface S1 as a function of the ascertained localization quality.

This also makes it possible to at least partially deactivate a functionality in the automated motor vehicle that requires a higher localization quality than is able to be currently reached if a required localization quality is not attainable using the existing landmark data. This can be because the device is not able to generate enough landmark data in the driving environment situation currently concerned, for example, in a driving environment that does not have a sufficient number of surface structures.

A motor vehicle driver can thereby be informed that a position finding is no longer sufficiently feasible for a specific functionality of the automated motor vehicle, and the mentioned functionality is, therefore, switched off.

Besides the driving environment data that is presently linked to location information and that has been communicated, already previously communicated driving environment data that are still available on server device 40, and/or previous localization reference data, already present on server device 40, can be included in the generation of the localization reference data.

Figure 2:
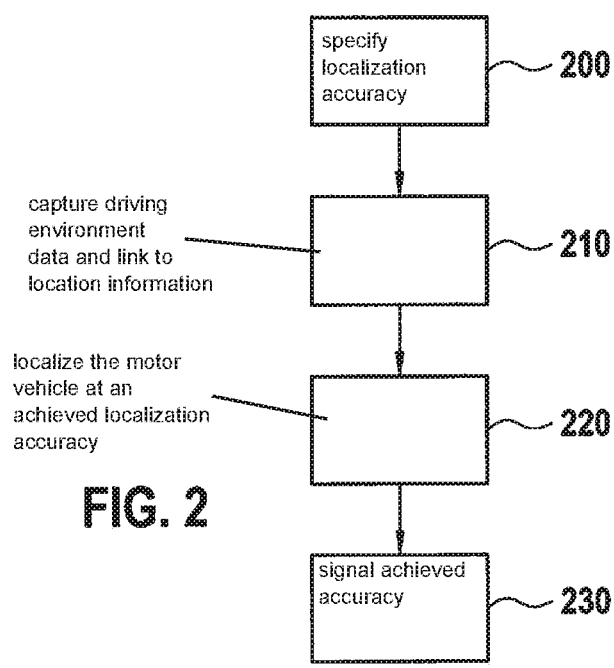
FIG. 2 a schematic flowchart of a method according to an example embodiment of the present invention.

FIG. 2 schematically shows a basic sequence of a method according to an example embodiment of the present invention. In a step 200, a localization accuracy is specified for the automated motor vehicle during operation, localization reference data for a defined location being requested by the motor vehicle at the defined localization accuracy to be attained and being communicated to the automated motor vehicle.

In a step 210, driving environment data of the automated motor vehicle are captured by a sensor device of the automated motor vehicle, and the captured driving environment data are linked to location information.

In a step 220, the automated motor vehicle is localized using the localization reference data and the captured driving environment data, an achieved localization accuracy being ascertained.

In a step 230, the achieved localization accuracy is signaled for purposes of optimizing the localization reference data for the localization accuracy to be attained.

An efficient operating method of a localization system is thus advantageously supported within the automated motor vehicle. The method can be advantageously used for any self-localization vehicles, for example, also for automated vehicles in the robotics sector.

One skilled in the art will suitably alter the features of the present invention and/or combine them with one another without departing from the spirit and scope thereof.

What is claimed is:

1. A method of an automated motor vehicle for optimized communication from a server of localization reference data for a defined location, the method comprising:
   using, by the motor vehicle, a sensor of the motor vehicle to capture driving environment data of the motor vehicle;
   linking, by the motor vehicle, the captured driving environment data to location information;
   based on the linking, the motor vehicle localizing the motor vehicle at an achieved localization accuracy, wherein the achieved localization accuracy is how accurately the motor vehicle localized itself during the localizing;

identifying, by the motor vehicle, a setpoint localization accuracy at which an operation of the motor vehicle is to be performed, wherein the setpoint localization accuracy is a setpoint for how accurately the motor vehicle is to localize itself for the operation of the motor vehicle;

signaling, by the motor vehicle to the server, the achieved localization accuracy; and transmitting, by the motor vehicle to the server, a request for the localization reference data at the setpoint localization accuracy based on the signaled achieved localization accuracy.

2. The method of claim 1, wherein at least one of a type and a volume of the localization reference data communicated to the motor vehicle in response to the transmitted request is dependent upon the signaled achieved localization accuracy and the setpoint localization accuracy.

3. The method of claim 2, wherein the server is external to the motor vehicle.

4. The method of claim 3, further comprising the motor vehicle transmitting the captured driving environment data to the server.

5. The method of claim 1, wherein driving environment conditions are considered for preparing a data record of the localization reference data to attain the setpoint localization accuracy.

6. The method of claim 1, wherein properties of the sensor are considered for preparing a data record of the localization reference data to attain the setpoint localization accuracy.

7. The method of claim 1, wherein the localization reference data is generated by a computer and is provided by the computer to the server.

8. The method of claim 7, wherein a computer in the motor vehicle generates additional localization reference data used in combination with the localization reference data from the server.

9. The method of claim 1, wherein the localization reference data is communicated to the motor vehicle in a volume that is decreased by a defined amount in response to the signaled achieved localization accuracy being high.

10. The method of claim 1, wherein the localization reference data is communicated to the motor vehicle in a volume that is increased by a defined amount in response to the signaled achieved localization quality being low.

11. The method as recited in claim 1, wherein the achieved localization accuracy is how accurately the motor vehicle determined its location in its driving environment during the localizing, and wherein the setpoint localization is a setpoint for how accurately the motor vehicle is to determine its location in the driving environment for the operation of the motor vehicle.

12. A system of an automated motor vehicle for optimized communication from a server of localization reference data for a defined location, the method comprising:
   a sensor;
   a computer; and
   an interface;
   wherein the computer is configured to:
      localize the motor vehicle at an achieved localization accuracy based on driving environment data captured by the sensor, wherein the achieved localization accuracy is how accurately the motor vehicle localized itself during the localization;
      identify a setpoint localization accuracy at which an operation of the motor vehicle is to be performed, wherein the setpoint localization accuracy is a setpoint for how accurately the motor vehicle is to localize itself for the operation of the motor vehicle;
      signal, to the server via the interface, the achieved localization accuracy; and
      transmit, to the server via the interface, a request for the localization reference data at the setpoint localization accuracy based on the signaled achieved localization accuracy, which localization reference data the computer is configured to receive from the server via the interface.

13. The system as recited in claim 12, wherein the achieved localization accuracy is how accurately the motor vehicle determined its location in its driving environment during the localizing, and wherein the setpoint localization is a setpoint for how accurately the motor vehicle is to determine its location in the driving environment for the operation of the motor vehicle.

14. A non-transitory computer-readable medium on which are stored instructions that are executable by a processor of a motor vehicle and that, when executed by the processor, cause the processor to perform a method for optimizing communication from a server of localization reference data for a defined location, the method comprising:
   using a sensor of the motor vehicle to capture driving environment data of the motor vehicle;
   linking the captured driving environment data to location information;
   based on the linking, localizing the motor vehicle at an achieved localization accuracy wherein the achieved localization accuracy is how accurately the motor vehicle localized itself during the localizing;
   identifying a setpoint localization accuracy at which an operation of the motor vehicle is to be performed, wherein the setpoint localization accuracy is a setpoint for how accurately the motor vehicle is to localize itself for the operation of the motor vehicle;
   signaling the achieved localization accuracy to the server; and
   transmitting to the server a request for the localization reference data at the setpoint localization accuracy based on the signaled achieved localization accuracy.

15. The non-transitory computer-readable medium as recited in claim 14, wherein the achieved localization accuracy is how accurately the motor vehicle determined its location in its driving environment during the localizing, and wherein the setpoint localization is a setpoint for how accurately the motor vehicle is to determine its location in the driving environment for the operation of the motor vehicle.

* * * * *